P. Marcy.
Potato Digger.
Nº 33,093.  Patented Aug. 20, 1861.
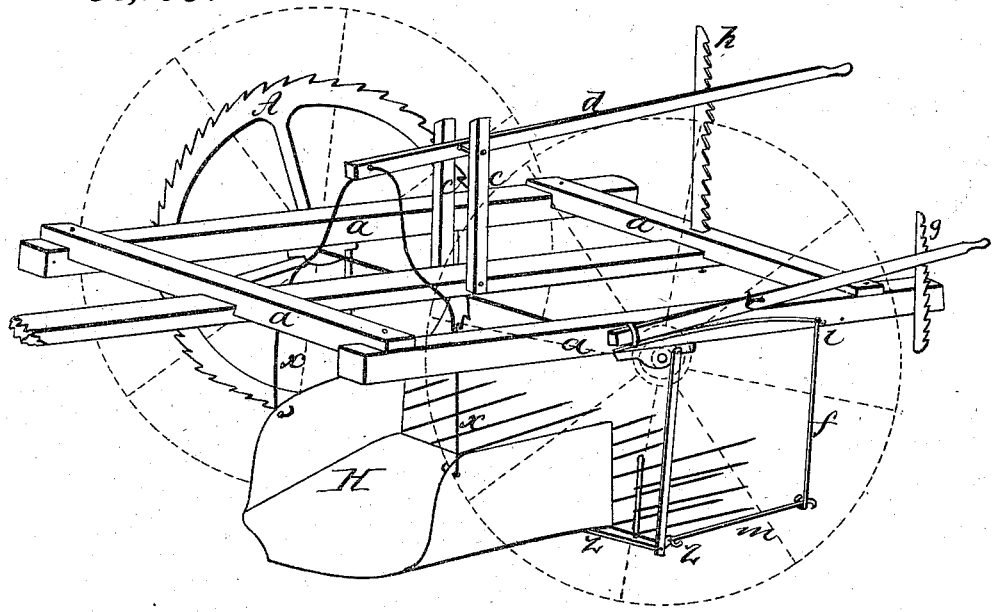
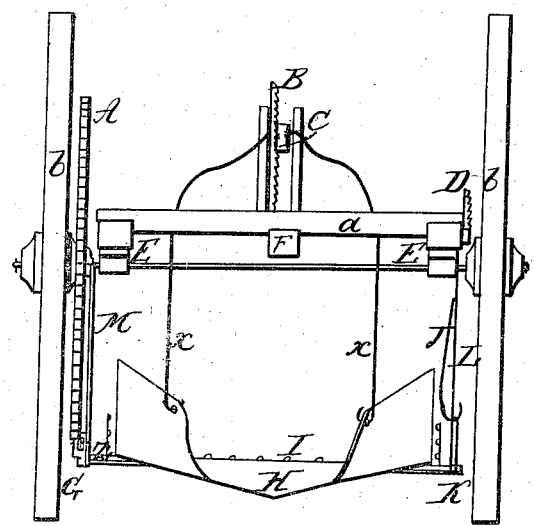
Witnesses,
C. M. Alexander
A. A. Yeatman
Inventor,
Perry Marcy

UNITED STATES PATENT OFFICE.

PERRY MARCY, OF TUNKHANNOCK, PENNSYLVANIA.

IMPROVEMENT IN POTATO-DIGGERS.

Specification forming part of Letters Patent No. 33,093, dated August 20, 1861.

*To all whom it may concern:*

Be it known that I, PERRY MARCY, of Tunkhannock, Wyoming county, Pennsylvania, have invented certain new and useful Improvements in Potato-Diggers; and I do hereby declare that the following is a full, clear, and exact description of the same, reference being had to the accompanying drawing, and to the letters of reference marked thereon.

The nature of my invention consists in arranging certain parts of this machine in the manner hereinafter described.

In the annexed drawing, making part of this specification, $a\ a$ represent the frame of the machine, which is supported upon an axle, E, said axle being provided with two wheels, $b\ b$, as shown in the drawing.

Beneath the frame $a\ a$ is a scraper, H, which is made in the form represented, having wings on each side, and being made narrower at the front than at the rear, so that the potatoes and dirt received upon it will be scattered over a broader surface as they enter upon the seive at the rear of said scraper. This scraper is hinged at its rear to a rod which connects the two supports M L, which depend from the frame $a\ a$. The front end of the scraper is connected to a lever, $d$, by means of the rods $x\ x$. The lever $d$ has its fulcrum upon a bar, which connects the upper ends of the supports or standards $c\ c$ upon the frame.

$h$ is a ratchet-bar, into which the lever catches with its loose end for the purpose of stationing it at any desired point. When the lever is moved the front end of the scraper is made to rise or fall as may be required.

A rod, $z$, with arms or teeth secured to it so as to form a screen, is made to pass across from the lower ends of the supports M L. This rod has its bearings in these supports and rests immediately under the scraper H at its rear. $m$ is an arm of the rod $z$, which is connected at its outer end to a spring, $i$, by means of a connecting-rod, $f$. The spring $i$ is secured to the under side of a lever, $e$, as shown in Fig. 1. The loose end of the lever $e$ catches into the teeth upon a ratchet-bar, $g$, and is thus held in proper position. By raising the lever $e$ the spring $i$ is tightened with reference to the sieve. Upon the other end of the rod $z$ is secured an arm, to which is attached a friction-wheel, as seen at G. This wheel plays between the teeth of the large ratchet-wheel A, which is secured upon the main axle E E. The teeth of the ratchet-wheel cause a vibration of the arm and friction-wheel, and consequently a vibration of the screen.

When potatoes pass onto the scraper by its running under them the earth with them passes back, and, being separated upon the widening scraper, is received upon the vibrating screen. The earth and potatoes are thrown into the air by the screen and fall behind the machine perfectly separated, so that the potatoes are in good condition for gathering.

Having thus fully described my invention, what I claim as new, and desire to secure by Letters Patent, is—

The arrangement of the lever $e$, spring $i$, and connecting-rod $f$ with the screen, operating as set forth, the several parts being used as and for the purpose specified.

PERRY MARCY.

Witnesses:
C. M. ALEXANDER,
A. A. YEATMAN.